(12) United States Patent
Sawada et al.

(10) Patent No.: US 6,332,045 B1
(45) Date of Patent: Dec. 18, 2001

(54) IMAGE PROCESSING DEVICE

(75) Inventors: Kenichi Sawada, Toyohashi; Atsushi Ishikawa, Okazaki, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/199,406

(22) Filed: Nov. 25, 1998

(30) Foreign Application Priority Data

Nov. 25, 1997 (JP) .................................................... 9-340671

(51) Int. Cl.[7] ...................................................... G06F 15/70
(52) U.S. Cl. ............................................ 382/272; 382/261
(58) Field of Search ................................... 382/260–269, 382/270–273, 251–252, 237

(56) References Cited

U.S. PATENT DOCUMENTS

| | | | |
|---|---|---|---|
| 5,363,210 | * 11/1994 | Sasaki et al. | 358/448 |
| 5,463,478 | 10/1995 | Makita et al. | 358/455 |
| 5,757,976 | * 5/1998 | Shu | 382/252 |

FOREIGN PATENT DOCUMENTS

| | | |
|---|---|---|
| 63-214079 | 9/1988 | (JP) . |
| 6-30274 | 2/1994 | (JP) . |
| 7-273990 | 10/1995 | (JP) . |

* cited by examiner

Primary Examiner—Thomas D. Lee
Assistant Examiner—Stephen Brinich
(74) Attorney, Agent, or Firm—Burns, Doane, Swecker & Mathis, LLP

(57) ABSTRACT

An image processing device includes an image data correction unit for correcting multi-level image data of a target pixel; an image data binarizer for binarizing the corrected multi-level image data of the target pixel; a binarization error calculator which calculates a first error between the corrected multi-level image data and the image data of pixels within a first region on a periphery of the target pixel that is binarized by the image data binarizer; and a device for executing a predetermined filtering process on the first error to calculate a second error, and for weighting and averaging the second error for pixels within the first region; wherein the image data correction unit corrects the multi-level image data by using the weighted and averaged second error.

8 Claims, 17 Drawing Sheets

| 1/9 | 1/9 | 1/9 |
|---|---|---|
| 1/9 | 1/9 | 1/9 |
| 1/9 | 1/9 | 1/9 |
FIG. 3
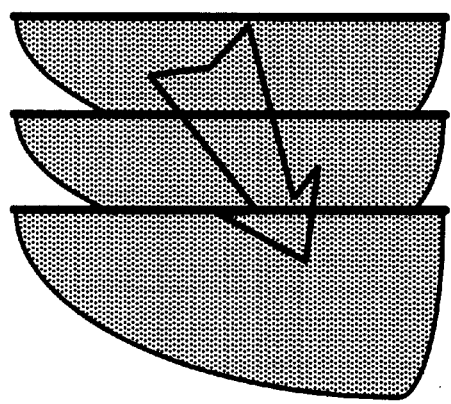
FIG. 4A
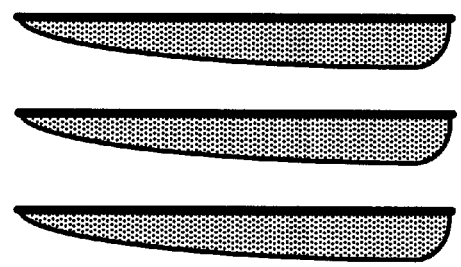
FIG. 4B

| 1/9 | 1/9 | 1/9 |
|-----|-----|-----|
| 2/9 | 2/9 | 2/9 |

FIG. 8

| 1/16 | 1/16 | 1/16 |
|------|------|------|
| 2/16 | 3/16 | 2/16 |
| 2/16 | 2/16 | 2/16 |

FIG. 10

IMAGE PROCESSING DEVICE

BACKGROUND OF THE INVENTION

This application is based on application No. 9-340671 filed in Japan on Nov. 25, 1997, the content of which is hereby incorporated by reference.

1. Field of the Invention

The present invention relates to an image processing device for binarizing multi-level image data.

2. Description of the Related Art

In a conventional image processing device for processing image data to form an image, data processing is executed to binarize brightness of an image including consecutive gradient levels as values of [0] and [1]. Conventional data processing executed in such an image processing device is described below.

FIG. 17 is a block diagram briefly illustrating the general construction of an image processing device.

The image processing device includes MPU 1 for overall control of the device, image input unit 2 comprising photoelectric conversion elements such as charge-coupled device (CCD) and the like and a drive system for driving said photoelectric conversion elements to scan the image of a document, analog-to-digital (A/D) converter 3 for converting analog image data obtained by said image input unit 2 to digital data, Log converter 4 for logarithmic conversion, sharpness correction (MTF correction) unit 5 for correcting sharpness, gamma correction unit 6 for gamma correction, image binarizer 7 for binarizing image data, and image memory 8 for storing an image based on data obtained from image binarizer 7. Each unit from image input unit 2 through image memory 8 is connected to MPU 1 via the MPU system bus, and said units are connected serially via the image data bus. These units are controlled by MPU 1 via the MPU system bus, and the various units exchange image data through the image data bus.

The various units of the aforesaid image processing device are described below. Image input device 2 generates standardized analog signals by scanning a current document comprising, for example, continuous gradient image and line image and the like, and A/D converter 3 quantizes said standardized analog signals as continuous gradient reflection data possessing values of 8-bits (256 gradient levels) for one pixel. The Log converter 4 calculates b-bit continuous gradient density data having a logarithmic relationship to the continuous gradient reflection data, and sharpness correction unit 5 executes sharpness correction of the image by means of the continuous gradient density data using a digital filter such as a Laplacian filter or the like.

Gamma correction unit 6 accomplishes gamma correction by means of non-linear gamma correction data using a 256 word 8-bit LUT (Look Up Table) RAM to realize desired gamma characteristics of the overall image processing device by correcting the difference of the gradient curves of the image input unit 2 and the image recording unit 8, or to realize desired gamma characteristics of the operator of the image processing device.

Image binarizer 7 converts the gamma corrected 8-bit continuous gradient density data to 1-bit binary data in accordance with the brightness using an area gradient binarization method such as an error diffusion method or the like. The image is recorded on a recording medium by the image recording unit 8 such as an electrophotographic printer, inkjet printer or the like based on the 1-bit binary data obtained above.

The error diffusion method used in the aforesaid image binarizing unit 7 of the image processing device disperses the error by calculating the density difference (binarization error) of each pixel of the input image density and output image density, and executes specific weighting of the calculation result relative to the peripheral pixels of the target pixel, and adds the image density of the target pixel.

This error diffusion method was reported by W. Floyd and L. Steinberg in the publication "An adaptive algorithm for spatial gray scale," SID; 17; pp. 75~77(1976).

In the binarization process, input multi-level image data are designated f(x,y) in equation (1) of Section 1, output binary image data are designated (x,y) in equation (2), and binarization error Exy is represented in equation (3).

The error diffusion method reduces error by averaging the value Exy, and accomplishes correction by adding the weighted average error of peripheral error relative to the input multi-level image data. The weighted average error Eavexy is expressed in equation (4). The peripheral pixels in the main scan direction and subscan direction relative to a target pixel are specified by the values k and l. In general, the weighted coefficients mk and l become larger nearer the target pixel, and the value S is determined using 5 peripheral pixels in the main scan direction and 3 peripheral pixels in the subscan direction.

In this way the corrected image data of the target pixel can be expressed by equation (5), and the corrected image data f'(x,y) can be binarized by a predetermined threshold value Th to obtain g(x,y) of equation (6).

The binarization error Exy is derived from the standardized binary image data g'(x,y) obtained from corrected image data f'(x,y) and binary image data g(x,y) as shown in equation (7). In general, the standardized binary image data g'(x,y) is expressed by equation (8), and the values HB and LB refer to the upper limit (=1) and lower limit (=0) of the dynamic range of the respective pixels.

Equations (1)~(8)

$$f(x,y)(0 \leq f(x,y) \leq 1) \tag{1}$$

$$g(x,y)(=0 \text{ or } 1) \tag{2}$$

$$E_{xy} = f(x,y) - g(x,y) \tag{3}$$

$$E_{avexy} = \frac{1}{\sum_{k,l \in S} m_{k,l}} \sum_{k,l \in S} m_{k,l} E_{x-k,y-l} \tag{4}$$

$$f'(x,y) = f(x,y) + E_{avexy} \tag{5}$$

$$g(x,y) = \begin{cases} 1(f'(x,y) \geq Th) \\ 0(f'(x,y) < Th) \end{cases} \tag{6}$$

$$E_{xy} = f'(x,y) - g'(x,y) \tag{7}$$

$$g'(x,y) = \begin{cases} HB(g(x,y) = 1) \\ LB(g(x,y) = 0) \end{cases} \tag{8}$$

In this way, the binarization error Exy and weighted average error Eavexy can be expressed by equations (9) and (10) of Section 2, and then are used to construct a feedback loop as shown in FIG. 18.

Equations (9)~(10)

$$E_{xy} = f(x,y) + E_{avexy} - g(x,y) \quad (9)$$

$$E_{avexy} = \frac{1}{\sum_{k,l \in S} m_{k,l}} \sum_{k,l \in S} m_{k,l} E_{x-k, y-l} \quad (10)$$

The image binarizer 7 of a conventional image processing device which binarizes image data using the aforesaid error diffusion method is described below. FIG. 18 is a block diagram illustrating the image binarizer 7 in a conventional image processing device.

Image binarizer 7 comprises an image data correction unit 9 for correcting multi-level image data f(x,y) to corrected image data f'(x,y), image data binarizer 10 for binarizing corrected image data f'(x,y) to binary data g(x,y), selector 12 for obtaining standard binary image data g'(x,y) from said binary image data g(x,y), binarization error calculator 11 for calculating binarization error Exy from the corrected image data f(x,y) and standard binary image data g'(x,y), error memory unit 14 for temporarily storing binarization error across a predetermined region, and error weighting filter 13 for calculating the weighted average error Eavexy by weighting and averaging binarization error Exy across a predetermined region. The aforesaid error diffusion method is executed by the image binarization device 7 of the aforesaid construction.

The disadvantages described below arise from the previously described error diffusion method. A first disadvantage of the error diffusion method is the poor reproducibility of line/text images, particularly fine lines. This disadvantage generates image gaps in the propagation of the binarization error due to the fine width of the line image, and generates dots as the cumulative error caused by inversion of error codes causes the line to separate from the region, thereby producing distortion of the line image.

A second disadvantage of the error diffusion method is the generation of unique reticulations (texture) when processing an image of uniform density as in the case of photographic images. This disadvantage disperses error in a specific pattern in images of uniform density.

In order to avoid the aforesaid disadvantages, art has been proposed for controlling the direction of dispersion by controlling the weighting coefficients used in the filtering process as random numbers, art has been proposed for controlling the amount of dispersion by resetting the cumulative error, and art has been proposed to accomplish a filtering process of the binarized error data using a median filter or filter suitable for frequency characteristics of the generated reticulation patterns, and binarization processing using post-processed error data and input image data as disclosed in Japanese Laid-Open Patent Application No. SHO-63-214079.

Although the aforesaid art is effective for images of specific document such as line/text images and photographic images, they are not effective when combined. Specifically, the art of filter processing of binarized error data is effective in reducing the reticulation pattern because the error amplitude can be changed, but is ineffective for line/text images because the error diffusion cannot be controlled.

OBJECTS AND SUMMARY

In view of the aforesaid limitations, an object of the present invention is to provide an image processing device for binarizing multi-level image data to simply produce high quality images.

Another object of the present invention is to provide an image processing device for converting multi-level image data to image data having fewer levels to simply produce high quality images.

Another aspect of the present invention also pertains to an image processing device which calculates a first error between corrected image data and converted or binarized image data of pixels within a first region on the periphery of a target pixel, and corrects the multi-level image data of said target pixel based on adding said calculation result to the multi-level image data of said target pixel, and converts or binarizes the multi-level image data of said target pixel based on the corrected image data of said target pixel.

This image processing device accomplishes the aforesaid calculation by calculating a second error by subjecting the aforesaid first error to predetermined filtering process, and weighted averaging of said second error for pixels within said first region.

According to the present invention, respective to each pixel within a first region peripheral to a target pixel, the first error of corrected image data and the converted or binarized image data are subjected to a predetermined filtering process to obtain a second error, said second error is weighted and averaged for each pixel within said first region, and multi-level image data are corrected by adding said calculation result to the multi-level image data of said target pixel, and the multi-level image data of the target pixel are converted or binarized based on said corrected image data of the target pixel. In this way the conversion or binarization error dispersion is smoothly increased by the aforesaid predetermined filtering process, and the multi-level image data are easily converted or binarized to produce a high quality image.

The present invention also pertains to an image processing device which calculates a first error between corrected image data and binarized image data of pixels within a first region on the periphery of a target pixel, and corrects the multi-level image data of said target pixel based on adding said calculation result to the multi-level image data of said target pixel, and binarizes the multi-level image data of said target pixel based on the corrected image data of said target pixel.

This image processing device further comprises a first calculating means for calculating a second error by executing a predetermined filtering process on said first error, discrimination means for discriminating characteristics of a second region based on the calculation of image data within a second region overlapping said first region, and second calculation means for calculating a third error by weighting and averaging one or another error among said first error and said second error in said first region based on the discrimination result of said discrimination means, and wherein said calculation result is said third error.

The present invention may also discriminate the characteristics of a second region based on calculation of image data within said second region which overlaps said first region, and calculates a third error by weighted averaging of either said first error or said second error within said first region based on said discrimination result, and corrects multi-level image data by adding said third error to the multi-level image data of the target pixel, and binarizes the multi-level image data of the target pixel based on the corrected image data of said target pixel. In this way a suitable error is selected for pixels within the first region in accordance with the characteristics of the image data in a second region so as to smoothly increase the dispersion of the binarization error, and simply binarize multi-level image data to produce a high quality image regardless of whether the image is a line/text image, or photographic image.

Yet another aspect of the present invention pertains to an image processing device which calculates a first error between corrected image data and binarized image data of pixels within a first region on the periphery of a target pixel, and corrects the multi-level image data of said target pixel based on adding said calculation result to the multi-level image data of said target pixel, and binaries the multi-level image data of said target pixel based on the corrected image data of said target pixel.

This processing device further comprises a first calculating means for calculating a second error by executing a predetermined filtering process on said first error, discrimination means for discriminating characteristics of a second region based on the calculation of image data within a second region overlapping said first region, setting means for setting a coefficient used in said filtering process based on the discrimination result of said discrimination means, second calculation means for calculating a third error by weighting and averaging said second error in said first region, and wherein said calculation result is said third error.

According to the present invention, the characteristics of a second region may be discriminated based on calculation of image data within said second region which overlaps a first region, a coefficient for use in a filtering process is set based on said discrimination result, a second error is calculated by subjecting said first error to a predetermined filtering process using said set coefficient, and a third error is calculated by weighted averaging of said second error in said first region, and multi-level image data are corrected by adding said third error to the multi-level image data of a target pixel, and the multi-level image data of said target pixel are binarized based on the corrected image data of said target pixel. In this way a coefficient is set for use in a predetermined filtering process in accordance with the characteristics of image data of a second region, so as to smoothly increase the dispersion of the binarization error, and simply binarize multi-level image data to produce a high quality image regardless of whether the image is a line/text image, or photographic image.

Still another aspect of the present invention relates to an image processing device, comprising an image data correction unit for correcting multi-level image data of a pixel; an image data converter for converting the corrected multi-level image data of the pixel into converted image data having fewer levels than the corrected multi-level image data; an error calculator which calculates an error between the corrected multi-level image data and data corresponding to the converted image data; means for discriminating characteristics of a region containing the pixel based on a discrimination calculation of image data within the region; means for executing a filtering process on the error to calculate a second error based on a discrimination result of the discriminating means, and wherein the image data correction unit corrects the multi-level image data by using the second error.

BRIEF DESCRIPTION OF THE DRAWINGS

FIG. 3 shows an example of a filter used by filter processing unit of FIG. 2;

FIG. 4 illustrates the propagation of binarization error;

FIG. 8 shows an example of a filter used by filter processing unit of FIG. 7;

FIG. 10 shows one example of two types of a filter used by the filter processing unit of FIG. 9;

DESCRIPTION OF THE PREFERRED EMBODIMENTS

Figure 1:
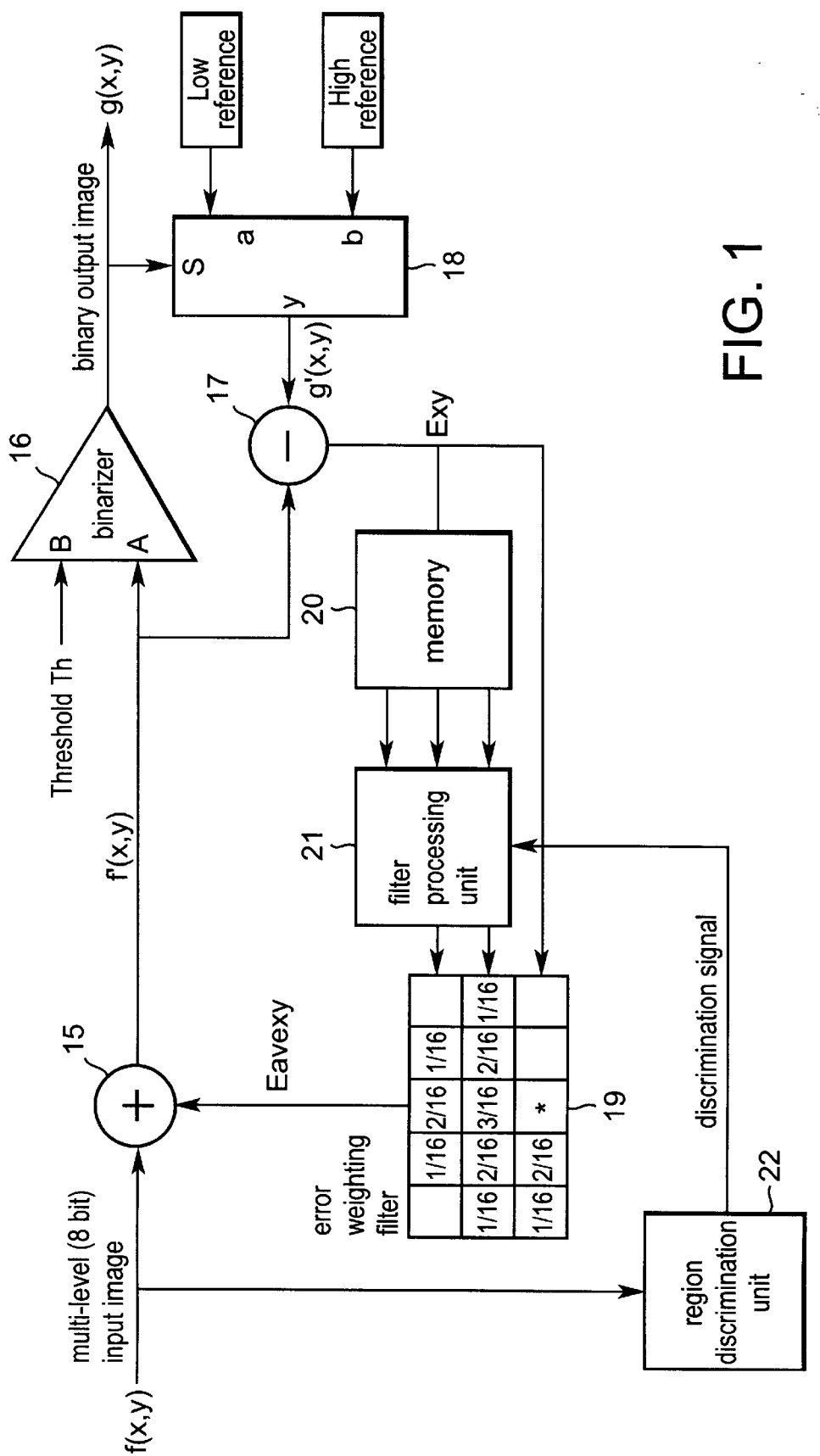
FIG. 1 is a block diagram showing the construction of an image binarizer of a first embodiment of an image processing device of the present invention.
Figure 17:
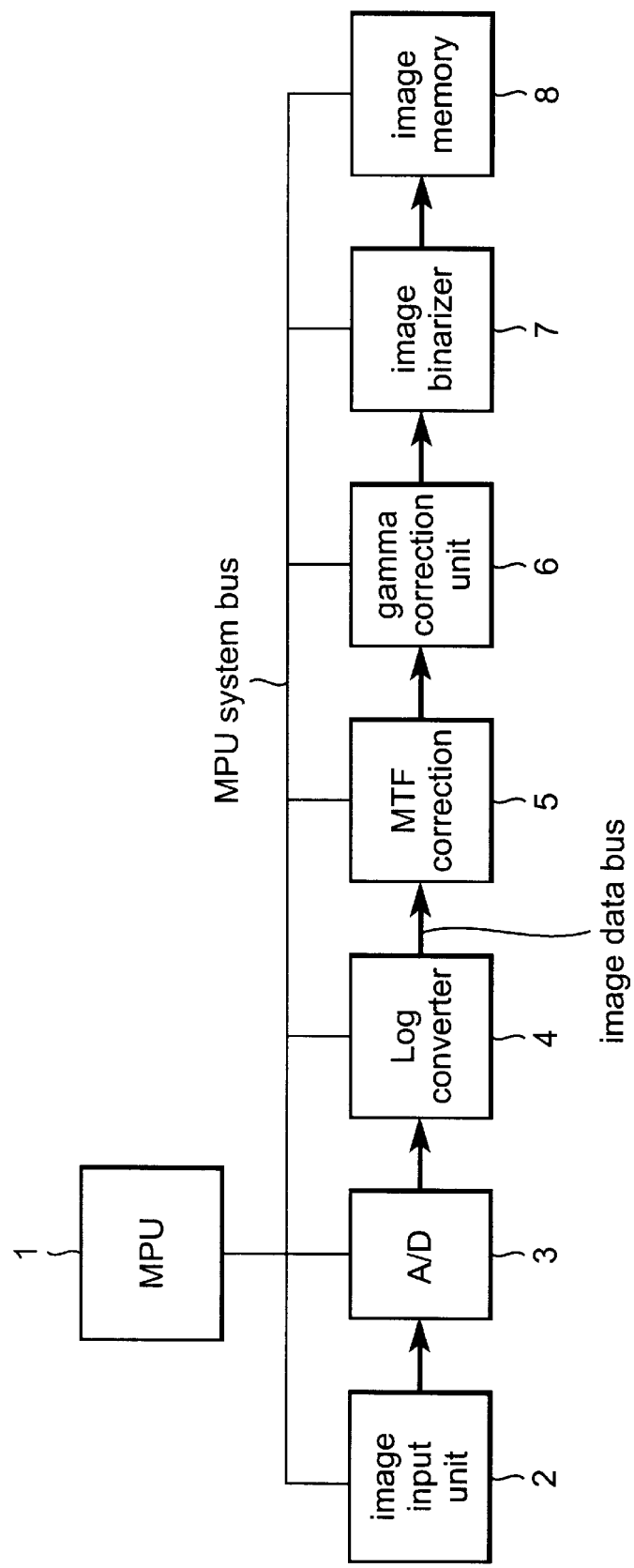
FIG. 17 is a block diagram briefly showing the general construction of a conventional image processing device.
Figure 18:
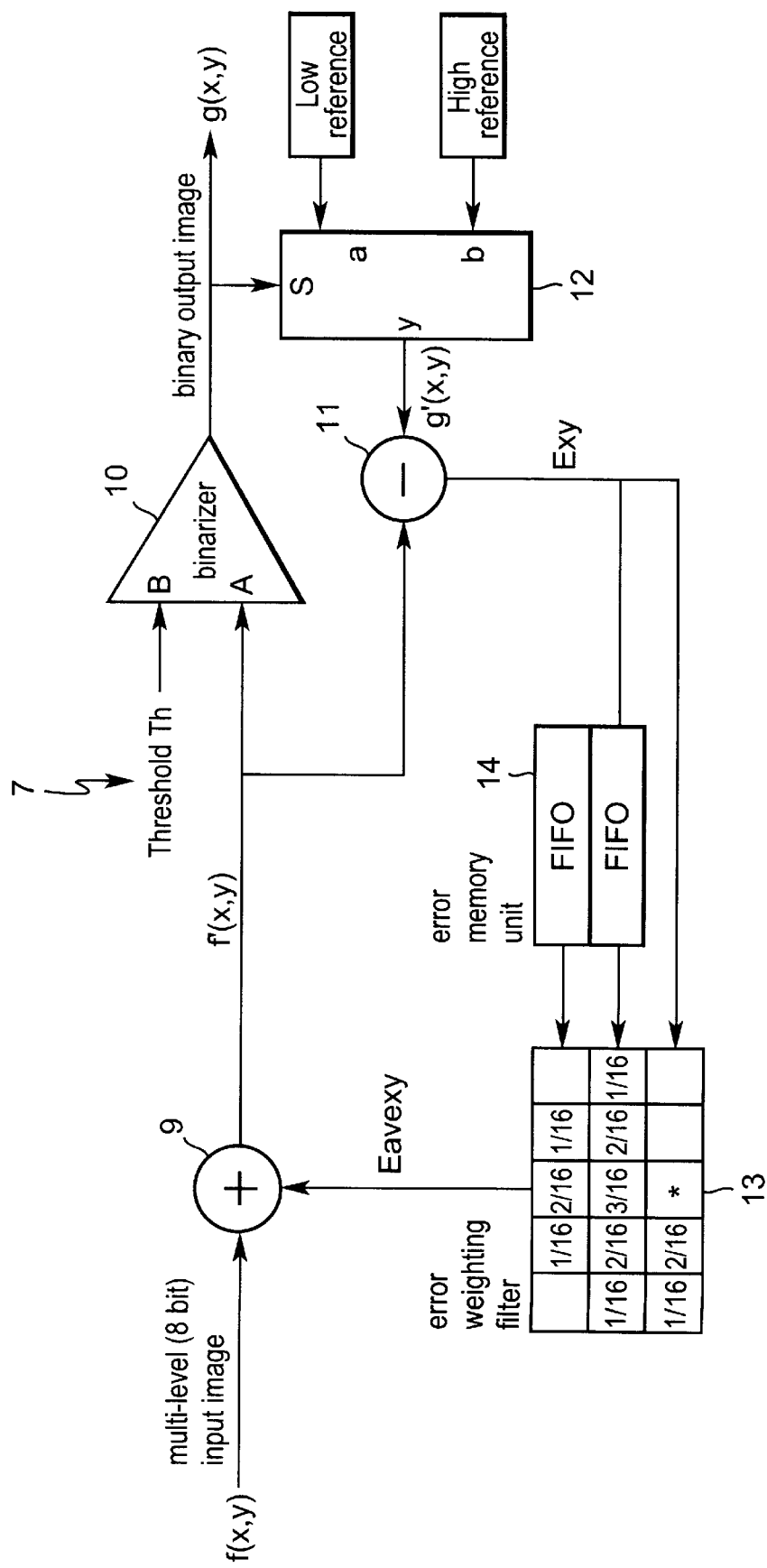
FIG. 18 is a block diagram showing an image of the binarizer of a conventional image processing device.

FIG. 1 is a block diagram illustrating the construction of an image binarizer 7 of a first embodiment of the image processing device of the present invention. The overall construction of this image processing device is substantially similar to the overall construction of the previously described conventional image processing device shown in FIG. 17.

In order to execute the error dispersion process, image binarizer 7 comprises image data correction unit 15 for correcting multi-level image data f(x,y) to corrected image data f'(x,y), image data binarizer 16 for binarizing corrected image data f'(x,y) to binary image data g(x,y), selector 18 for obtaining standard binary image data g'(x,y) from binary image data g(x,y), binarization error calculator 17 for calculating binarization error Exy from corrected image data f'(x,y) and standard binary image data g'(x,y), and memory 20 for temporarily storing binarization error Exy across a predetermined region.

Image binarizer 7 further comprises filter processing unit 21 for filtering binarization error Exy, error weighting filter 19 for calculating the weighted average error Eavexy from the filtered binarization error Exy, and region discrimination unit 22 for discriminating whether a region at a predetermined location including the region in the binarization process is a line/text image region or a photographic image region.

The binarization error Exy calculated in binarization error calculator 17 is stored in memory 20, and filtering is executed by filter processing unit 21 by switching the process in accordance with the location region discrimination result of region discrimination unit 22. A weighting calculation is executed for filtered data (or unfiltered data passing through filter processing unit 21) using data of three lines stored in memory 20 via the error weighting filter 19. Multi-level image data f(x,y) are corrected to corrected image data f'(x,y) by image data correction unit 15 using the binarization error Exy obtained by the aforesaid weighting calculation, and the corrected image data f'(x,y) are binarized by image data binarizer 16 to obtain binary image data g(x,y).

Figure 2:
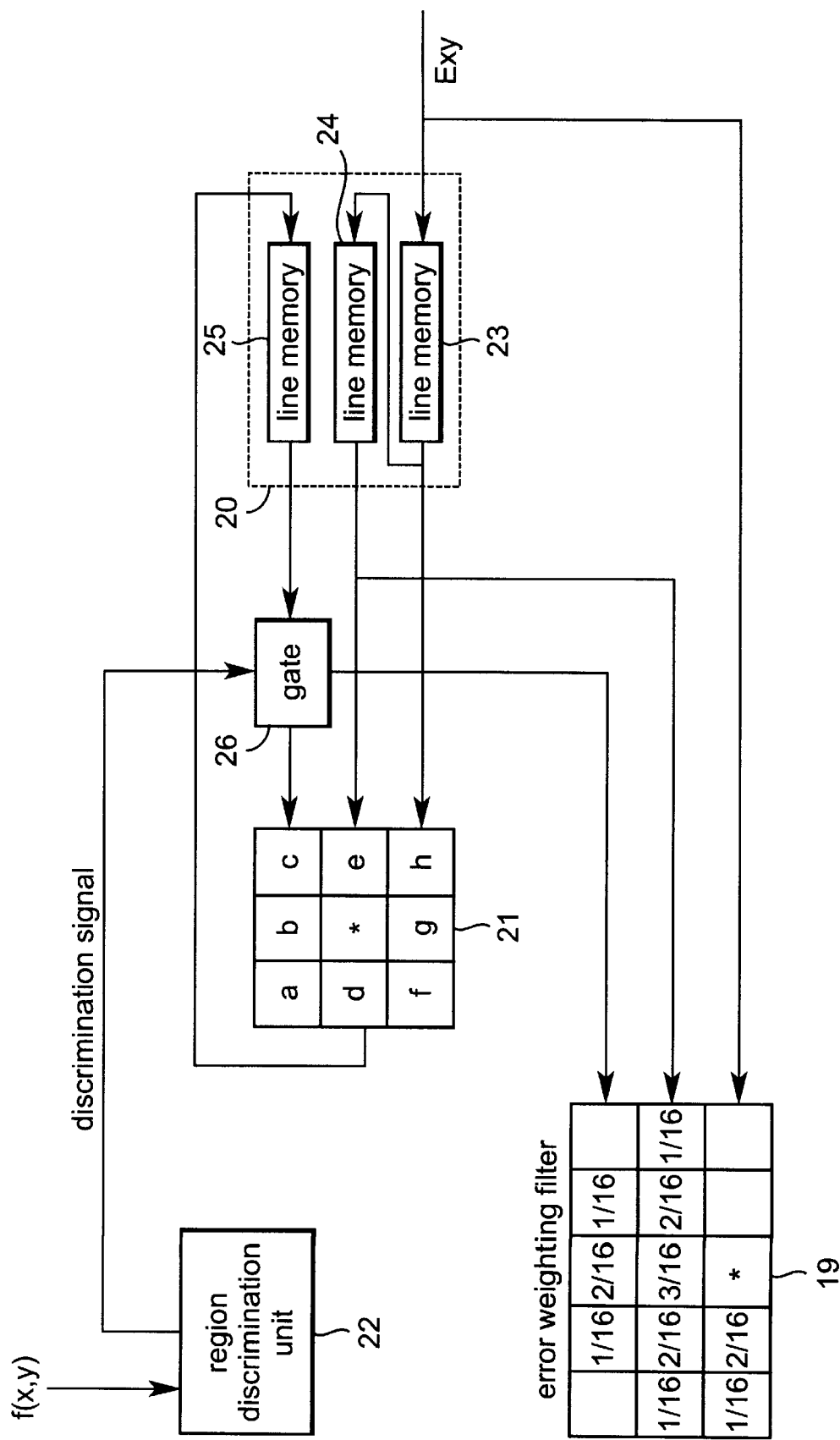
FIG. 2 shows a memory 20, filter processing unit, and a region discrimination unit of the image binarizer of FIG. 1.

FIG. 2 illustrates image binarizer 7 memory unit 20, filter processing unit 21, and region discrimination unit 22. FIG. 3 shows examples of filters used by the filter processing unit 21 of FIG. 2.

As shown in FIG. 2, memory unit 20 includes line memories 23 and 24 for storing binarization error Exy, and line memory 25 for storing data after processing by filter processing unit 21 (hereinafter referred to as "filtered data"), and filter processing unit 21 uses a smoothing filter having the 3×3 matrix structure shown in FIG. 3.

The smoothing filter process executed by filter processing unit 21 is executed with reference to current binarization error data stored in line memory 23, binarization error data of the previous line process is stored in line memory 24, and filtered data of the previous line process is stored in line memory 25. The target pixel of this filtering process is binarized error data of previous line processing stored in line memory 24, and the result of the smoothing process executed by filter processing unit 21 is recorded in line memory 25. This process result is referred to in the processing of the next line.

The filtered data obtained from the aforesaid processes executed by filter processing unit 21 are weighted and averaged for the target pixel by error weighting filter 19 (refer to FIG. 2), and added to the input multi-level image data by image data correction unit 15 (refer to FIG. 1), and subsequently subjected to binarization processing by image data binarizer 16 (refer to FIG. 1).

Region discrimination unit 22 (refer to FIG. 2) determines whether or not an input image contains region possessing smooth gradient changes as in photographic images, and the discrimination result is input to gate 26 as a discrimination signal. When input image data is determined by region discrimination unit 22 to contain a region possessing smooth gradient level change as in photographic images, binarization error data are input directly to error weighting filter 19 without filter processing by filter processing unit 21. When it is determined that the input image data does not contain a region possessing smooth gradient level change, the binarization error data are input to error weighting filter 19 after filtering by filter processing unit 21.

FIGS. 4(*a*) and 4(*b*) illustrate the propagation of binarization error. FIG. 4(*a*) illustrates binarization error propagation by a conventional image processing device. FIG. 4(*b*) illustrates binarization error propagation by the image processing device of the present invention. The binarization error propagation state when binarizing an image via the error diffusion method is expressed by the amount of diffusion (absolute value) and direction of propagation (indicated by arrow).

In the error propagation shown in FIG. 4(*a*), there is some error in adjacent line images due to delayed diffusion of error, producing dispersion and noise which reduce image quality.

Conversely, in the error propagation shown in FIG. 4(*b*), binarization error is subjected to processing which diffuses error in a small region. When canceled to prevent rapid dispersion by binarization error propagation, the binarization error is slight as in a photographic image and broad gradient characteristics are lost, such that a smoothing filter process is executed by filter processing unit 21 of the image processing device to gradually increase the smoothing effect by using the reproducibility of the process results in the processing of the next line, thereby controlling the error dispersion to achieve smooth diffusion.

Characteristics of binarization error are maintained in filter processing unit 21 of the present image processing device by including much reference data on binarization error for the filtering process (filtered data are stored for reference in 1-line segments in line memory 25, and binarization error data are stored in 2-line segments in line memories 23 and 24), there is no loss of resolution or gradient reproducibility in the present error diffusion method because line memory 25 which stores data filtered by filter processing unit 21 (refer to FIG. 2) corresponds to the line most distant from the target pixel referred to by error weighting filter 19 (refer to FIG. 2).

When the image has a smooth gradient change as in photographic images, the amplitude change of the binarization error is naturally reduced, such that when the binarization error is subjected to a smoothing process, binarization error is reduced, and change in corrected image data f'(x,y) (refer to FIG. 1) is minimized producing a case of false contour generation. To respond to this case, a determination is made in image binarizer 7 (refer to FIG. 1) of the present image processing device as to whether or not the image is a line/text image or photographic image via the region discrimination unit, and filter processing is selectably executed or not in accordance with the discrimination result.

Figure 5:
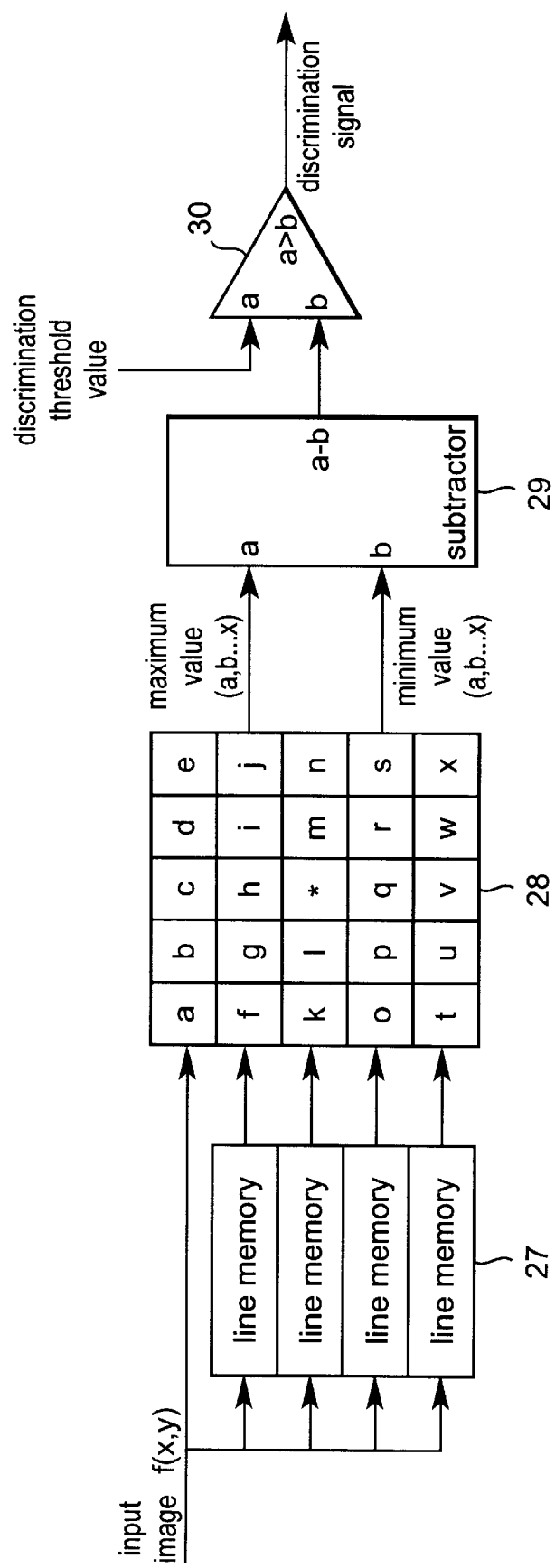
FIG. 5 shows a first region discrimination unit for determining whether or not a region is a photographic region.

The region discrimination unit 22 of FIG. 2 is described below. FIG. 5 shows a first region discrimination unit for determining whether or not a region is a photographic region.

The first region discrimination unit includes line memory 27, maximum value/minimum value filter 28, subtractor 29, and comparator 30. Input multi-level image data are stored in 4-line segments in line memory 27, and maximum values and minimum values of 25 pixels from a through x shown in the 5×5 region in the drawing are detected via maximum value/minimum value filter 28. The difference between the detected maximum value and minimum value (i.e., maximum value minus minimum value) is calculated by subtractor 29, and compared to the region discrimination threshold value stored in the microprocessing unit (MPU; i.e., MPU 1 in FIG. 17) via comparator 30. A photographic region is discriminated when the difference in maximum and minimum values is less than the threshold value, and a discrimination signal is output to gate 26 (refer to FIG. 2).

Figure 6:
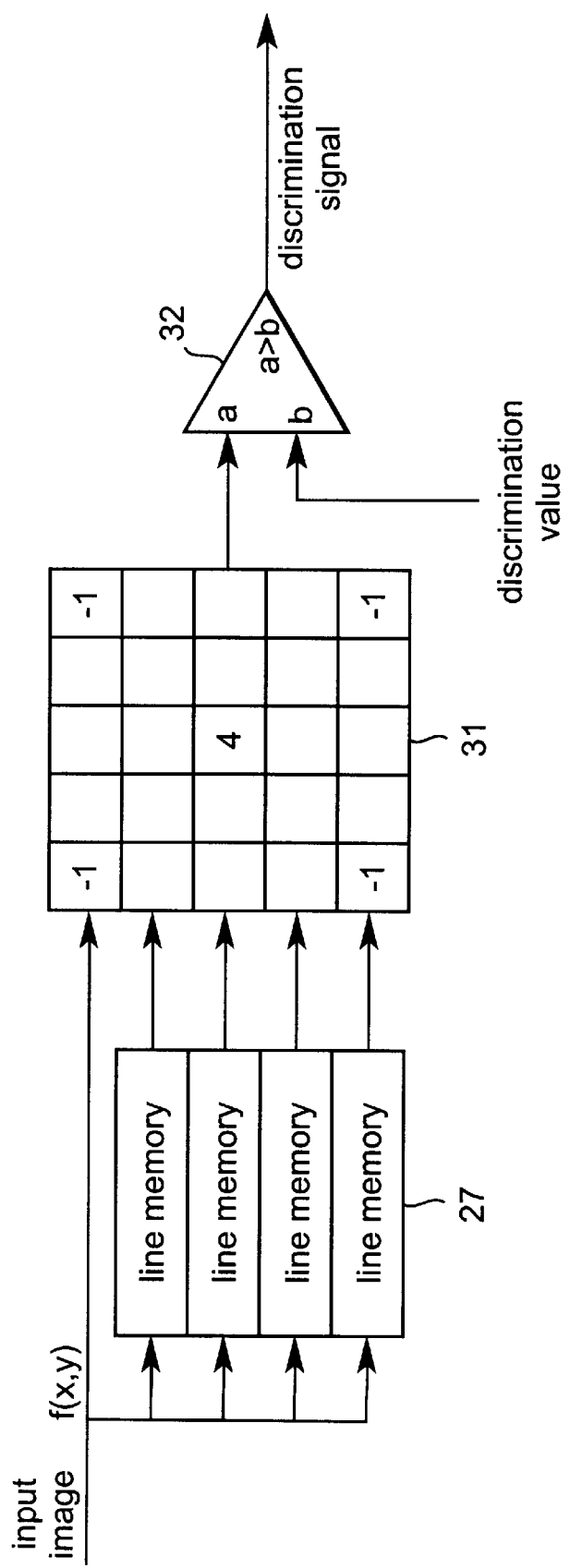
FIG. 6 shows a second region discrimination unit for determining whether or not a region is a photographic region.

The region discrimination unit may be constructed as follows. FIG. 6 shows a second region discrimination unit for discriminating whether or not a region is a photographic region.

The second region discrimination unit includes a line memory 27, edge detection filter 31, and comparator 32. Input multi-level image data are stored in 4-line segments in line memory 27, and the edge amount within a 5×5 region is detected by edge detection filter 31 comprising a primary fine filter, secondary fine filter and combination of both, and the absolute value of said detected edge amount is output. The detected edge amount is compared to a region discrimination threshold value by MPU (MPU1 in FIG. 17) via comparator 32. A photographic region is discriminated when the edge amount is less than the threshold value, and a discrimination signal is output to gate 26 (refer to FIG. 2).

According to the filter process of the present image processing device provided with image binarizer 7 including filter processing unit 21 and region discrimination unit 22, multi-level image data can be simply binarized to produce high quality images regardless of whether or not the image is a line/text image or photographic image. Furthermore, the filter process of image binarizer 7 is independent and separate from the calculation system within the feedback loop of the error diffusion method, therefore producing no load on the calculation speed of the feedback loop, and not requiring additional memory for the filter process.

As described above, filter processing unit 21 uses a smoothing filter of the 3×3 matrix shown in FIG. 3, but a matrix smoothing filter of another size, such as 5×5 may be used in accordance with the processed image, or a non-linear smoothing filter such as a median filter may be used in conjunction with changes in the structure of line filters 23–25 to improve effectiveness.

Second, third, and fourth embodiments of the image processing device of the present invention are described below. In the following description, parts having like functions are designated by like reference numbers.

Figure 7:
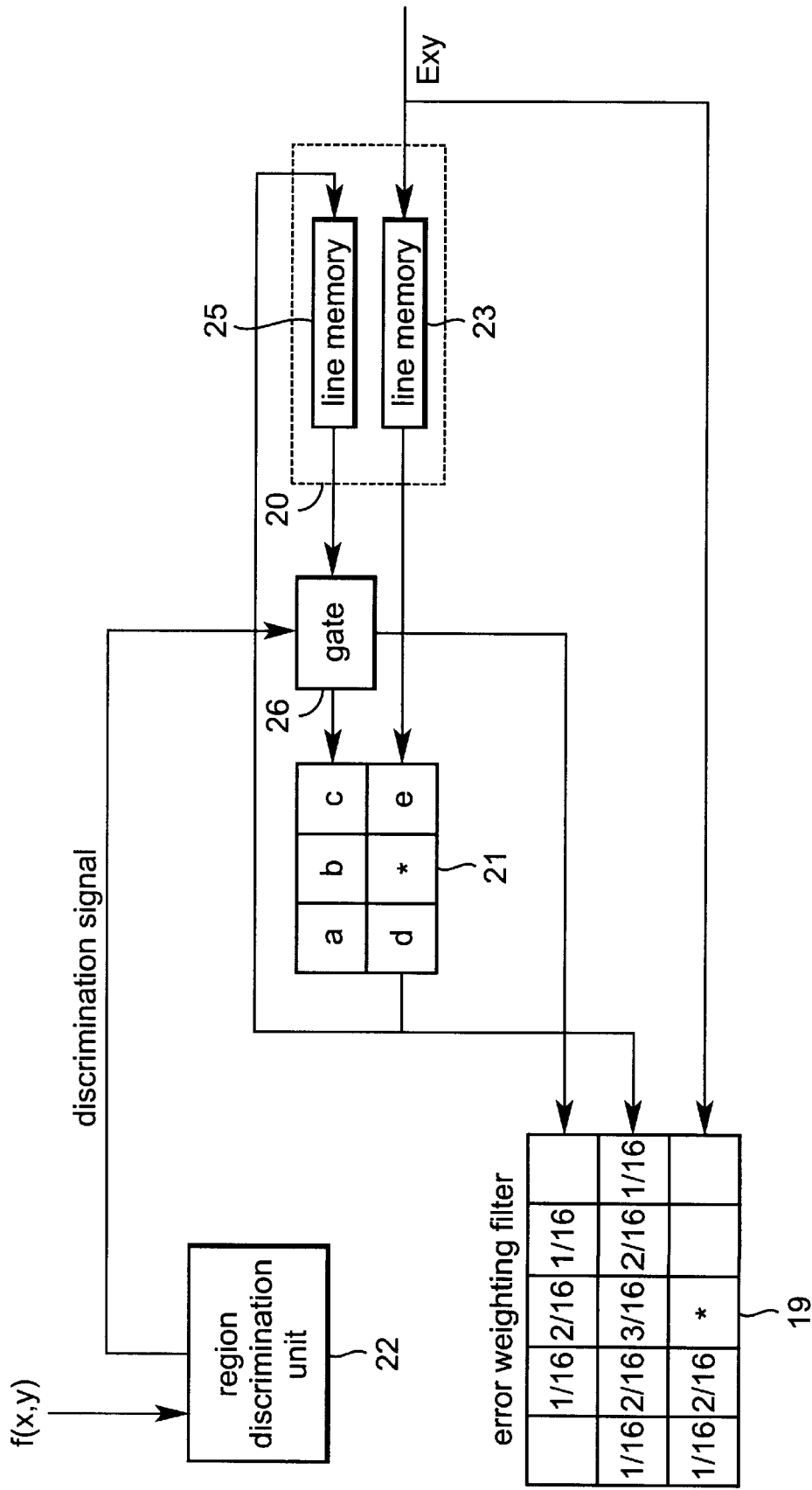
FIG. 7 shows a memory, a filter processing unit, and a region discrimination unit of an image binarizer of the image processing device of a second embodiment of the invention.
Figure 8:
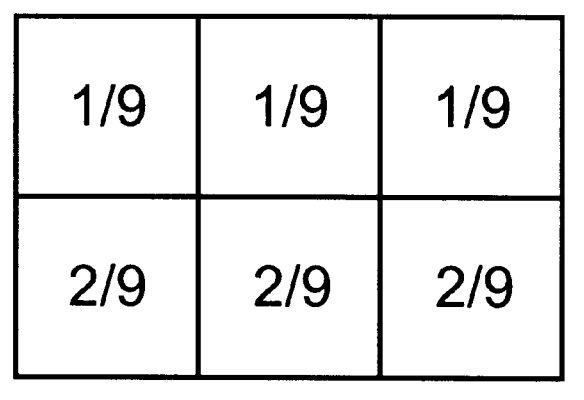

FIG. 7 shows memory 20, filter processing unit 21, and region discrimination unit 22 of image binarizer 7 of a second embodiment of the image processing device of the present invention. FIG. 8 shows an example of a filter used by filter processing unit 21 of FIG. 7. The general construction of the image processing device, and flow of data within the image binarizer is identical to the image processing device of the first embodiment.

As shown in FIG. 7, memory 20 includes a line memory 23 for storing binarization error Exy, and line memory 25 for storing filtered data processed by filtering processing unit 21. Filtering process unit 21 uses a smoothing filter having a 3×2 matrix shown in FIG. 8. The filtering coefficient of filter processing unit 21 is 2× the weighting coefficient to improve the effectiveness of the image processing device of the first embodiment. However, the present invention is not limited to this coefficient.

The smoothing process of filtering process unit 21 is executed with reference to the current binarization error data stored in line memory 23, and filtered data of the previous line stored in memory 25. The target pixel of the filtering process is the binarization error data of the previous line stored in line memory 23, and the result of the smoothing process is recorded in line memory 25, and this processing result is referred to for the next line.

The filtered data obtained by the aforesaid processing executed by filter processing unit 21 are weighted and averaged for the target pixel by error weighting filter 19 (refer to FIG. 7), and added to the input multi-level image data by image data correction unit 15 (refer to FIG. 1), then binarized by image data binarizer 16 (refer to FIG. 1).

The region discrimination unit 22 (refer to FIG. 2) determines whether or not the input image data represents a region with a smooth change in gradient as in the case of a photographic image, and the discrimination result is input to gate 26 as a discrimination signal. When region discrimination unit 22 determines that the input image data represents a region with a smooth gradient change such as a photographic image, the binarization error data are directly input to error weighting filter 19 without executing the filtering process of filter processing unit 21, whereas when region discrimination unit 22 determines that the input image data does not represent a region with a smooth gradient change such as a photographic image, the binarization error data are input to error weighting filter 19 after filtering by filter processing unit 21. Region discrimination unit 21 may be the same as that of the image processing device of the first embodiment, and is referred to in FIGS. 5 and 6.

As described above, the smoothing result is recorded in line memory 25 and is referred to in the smoothing processing of the next line, such that error diffusion can be smoothly controlled to increase the effectiveness of the smoothing process as the process progresses. Although the filtering process is accomplished using 2-line segments of binarization error data stored in line memory 23, the characteristics of the binarization error can be maintained by using more binarization error data.

According to the filtering process of the present image processing device provided with image binarizer 7 including filter processing unit 21 and region discrimination unit 22, multi-level image data can be simply binarized to produce high quality images regardless of whether the image is a line/text image, or photographic image. Furthermore, the filter process of image binarizer 7 is independent and separate from the calculation system within the feedback loop of the error diffusion method, therefore producing no load on the calculation speed of the feedback loop, and not requiring additional memory for the filter process.

Figure 9:
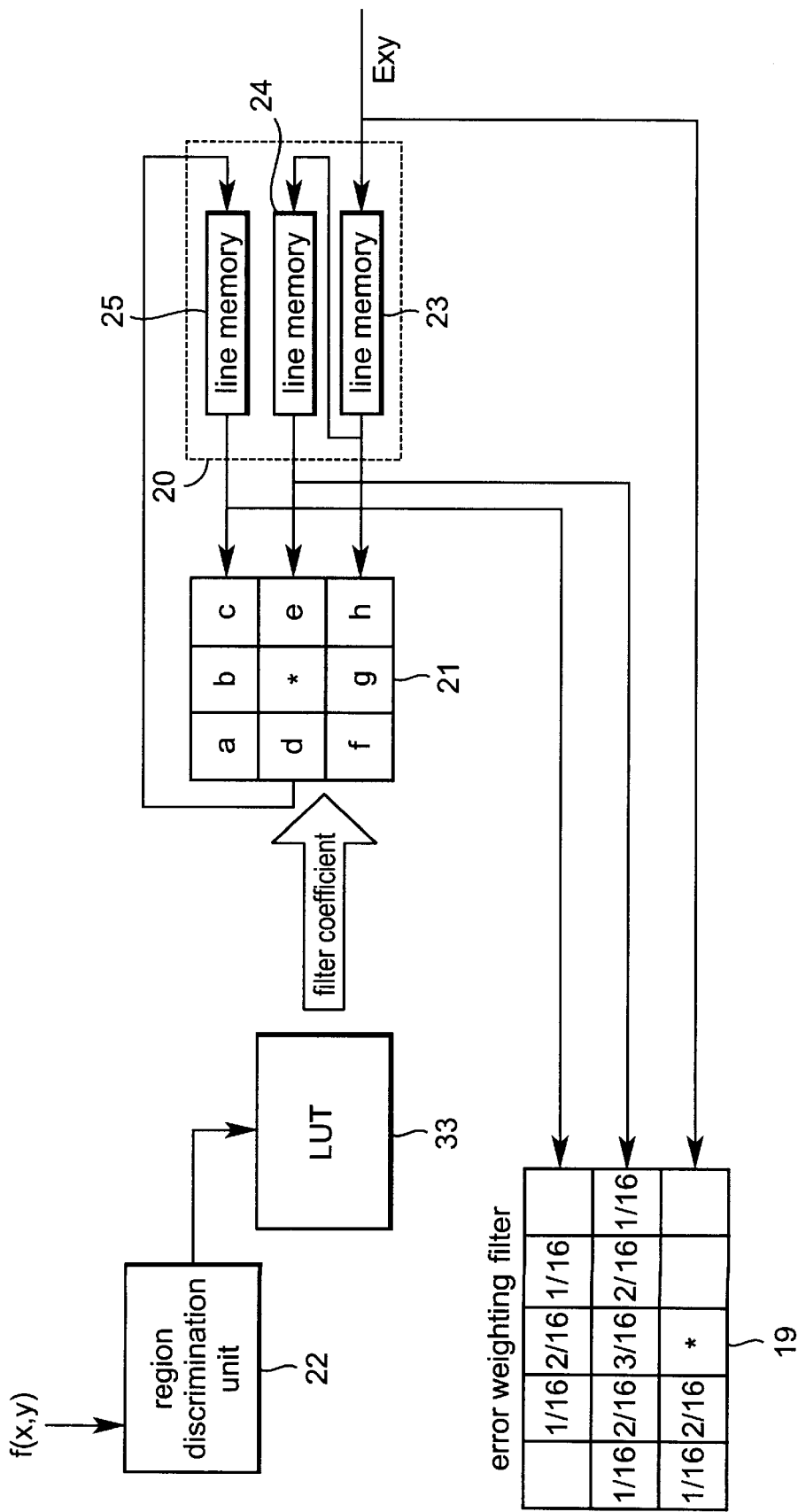
FIG. 9 shows a memory, a filter processing unit, and a region discrimination unit of image binarizer of the image processing device of a third embodiment of the invention.
Figure 10:
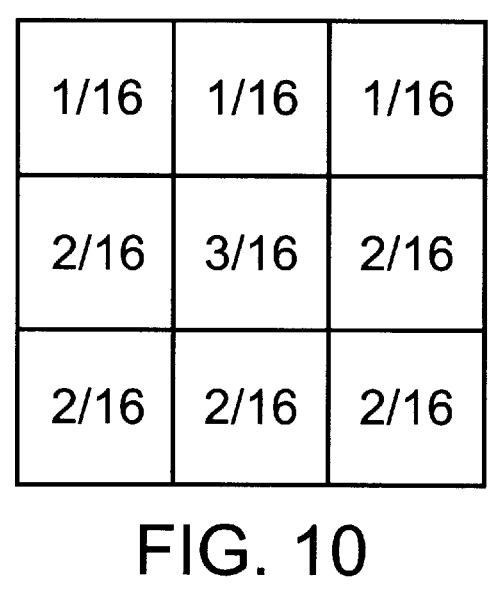

FIG. 9 shows memory 20, filter processing unit 21, and region discrimination unit 22 of image binarizer 7 of a third embodiment of the image processing device of the present invention. FIG. 10 shows one example among two types of filters used in the filter processing unit of FIG. 9. The general construction of the image processing device, flow of data within the image binarizer, and other processes other than setting the filter coefficient of the filter processing unit, and construction other than the structure used in said setting may be the same as the image processing device of the first embodiment.

As shown in FIG. 9, memory unit 20 includes line memories 23 and 24 for storing binarization error Exy, and line memory 25 for storing filtered data processed by filter processing unit 21; a look-up table 33 for storing the filter coefficients stores the filter coefficients of two types of filters shown in FIGS. 3 and 8.

Region discrimination unit 22 shown in FIG. 6 may be the same as that used in the image processing device of the first embodiment, and determines whether or not input image data represents a region with a smooth change in gradient as in a photographic image. Filtering coefficient of the filter used in the filter processing unit 22 is switched in accordance with said discrimination result.

That is, when region discrimination unit 22 determines that the input image data represents a region with a smooth gradient change such as a photographic image, false contour generation can be prevented by reducing the smoothing effectiveness of the filtering process by reducing filtering coefficients a, b, and c of the filter processing unit 21. When region discrimination unit 22 determines that the input image data does not represent a region with a smooth gradient change such as a photographic image, the filter coefficient of filter processing unit 21 is divided in equal portions, or coefficients a, b, and c are increased to improve the smoothing effect so as to attain excellent reproducibility of line/text images.

According to the filtering process of the present image processing device provided with image binarizer 7 including filter processing unit 21 and region discrimination unit 22, multi-level image data can be simply binarized to produce high quality images regardless of whether the image is a line/text image, or photographic image. Furthermore, the filter process of image binarizer 7 is independent and separate from the calculation system within the feedback loop of the error diffusion method, therefore producing no load on the calculation speed of the feedback loop, and not requiring additional memory for the filter process.

Figure 11:
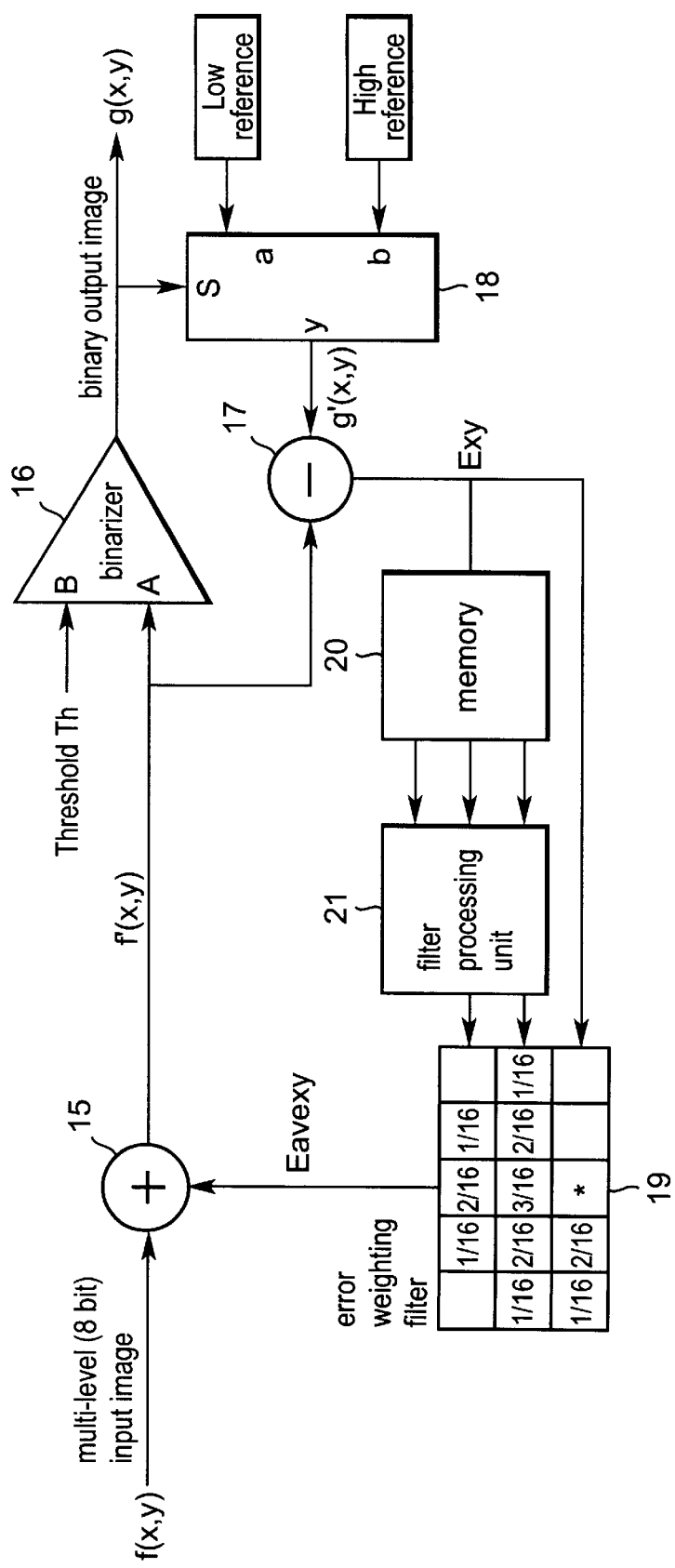
FIG. 11 is a block diagram showing the construction of an image binarizer of a fourth embodiment of an image processing device of the present invention.

FIG. 11 is a block diagram showing the construction of image binarizer 7 of the image processing device of a fourth embodiment of the present invention. FIG. 11 corresponds to FIG. 1 which is a block diagram illustrating the construction of image binarizer 7 of the image processing device of the first embodiment. The general construction of the present image processing device conforms to the general construction of the conventional image processing device previously described using FIG. 17.

Image binarizer 7 of the present image processing device differs from the image processing device of the first embodiment in that it is not provided with a device for determining whether or not a predetermined local region including a region being subjected to a binarization process is a line/text image region, or photographic image region (i.e., region discrimination unit 22 of FIG. 1).

The binarization error Exy calculated in binarization error calculator 17 is stored in memory 20, and filtered by the filter processing unit 21. The filtered data are weighted using data of 3-line segments in memory 20 via error weighting filter 19. The multi-level image data f(x,y) is corrected to corrected image data f'(x,y) by image data correction unit 15 via the binarization error Exy obtained by the aforesaid weighting calculation, and the corrected image data f'(x,y) is binarized by image data binarizer 16 to obtain binary image data g(x,y).

According to the filtering process of the present image processing device provided with image binarizer 7, multi-level image data representing line/text images in particular can be simply binarized to produce high quality images. Furthermore, the filter process of image binarizer 7 is independent and separate from the calculation system within the feedback loop of the error diffusion method, therefore producing no load on the calculation speed of the feedback loop, and not requiring additional memory for the filter process.

An image produced by image data binarized by the image binarizer of the image processing device of the present invention is described by way of comparison to an image produced by image data binarized by a conventional image processing device.

In a variation of the above-disclosed embodiments, the same principles and construction may be utilized, with the exception that, instead of binarizing the image data with a binarizer 16, the image data may be converted to image data having fewer shades of gray than the original image data.

In another variation, the first embodiment may be utilized without the error weighting filter 19. In such a case, the error data may be smoothed through the filtering processing unit 21 and used to correct the multi-level image f(x,y). The region discrimination unit 22 can be used to determine whether the multi-level image data f(x,y) is corrected by the filtered error data or by unfiltered error data in accordance with the principles set forth above.

Figure 12:
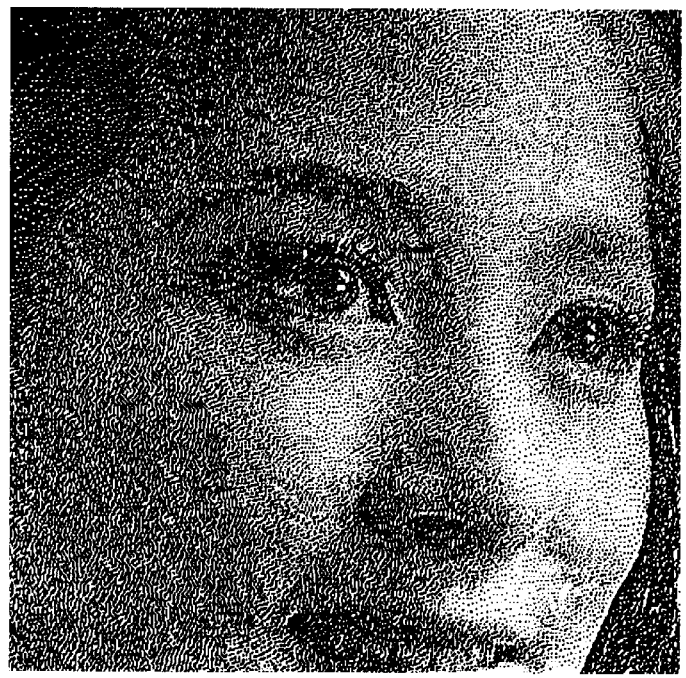
FIG. 12 shows an image produced by image data binarized by a conventional image processing device.
Figure 12:
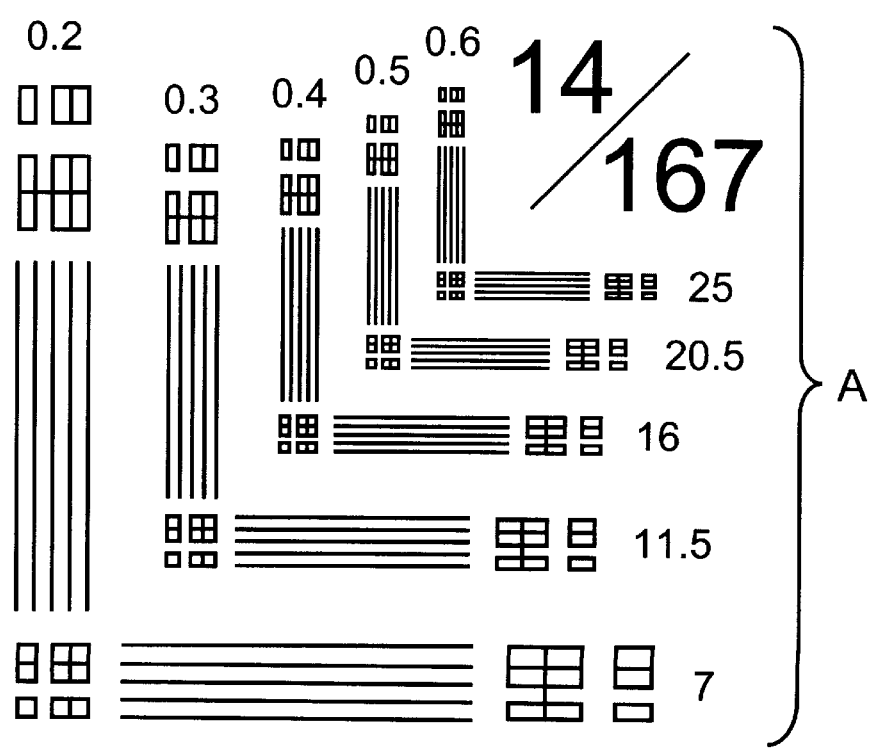

FIG. 12 shows an image produced by image data binarized by a conventional image processing device.

According to FIG. 12, in the conventional image processing device, dots are dispersed on the periphery of line/text image shown in section A, and definite breaks and shoulders appearing in line/text image are confirmed.

Figure 13:
FIG. 13 is a first illustration of an image produced by image data binarized by the image processing device of the first embodiment of the invention.
Figure 13:
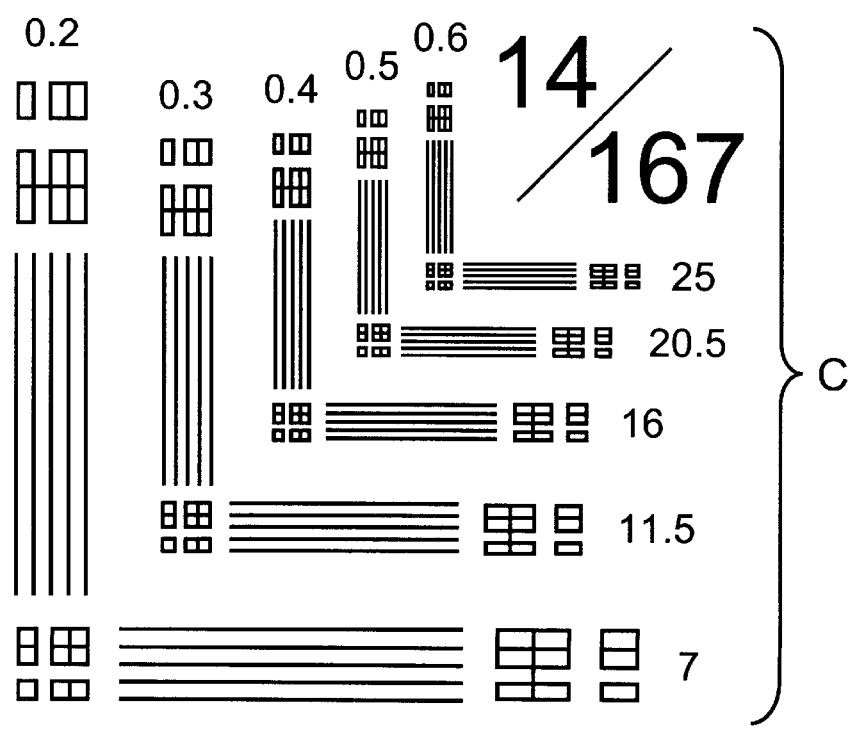
Figure 14:
FIG. 14 is a second illustration of an image produced by image data binarized by the image processing device of the first embodiment of the invention.
Figure 14:
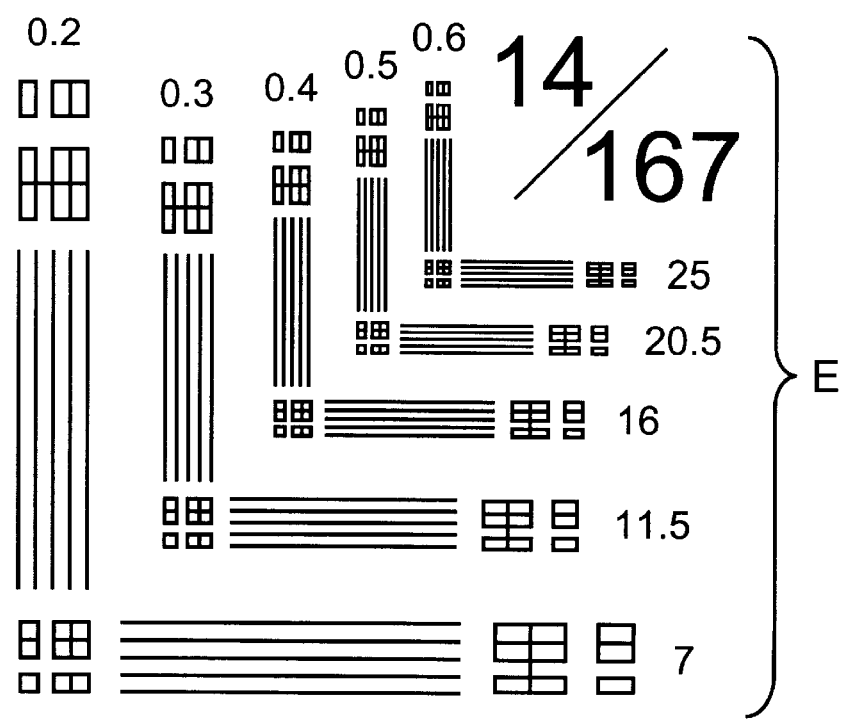

FIGS. 13 and 14 show an image produced by image data binarized by the image processing device of the first embodiment of the present invention. FIG. 13 shows an image produced using the first region discrimination unit (region discrimination via detection of maximum and minimum values) shown in FIG. 5 in the image processing device of the first embodiment, and FIG. 14 shows an image produced using the second region discrimination unit (region discrimination via edge detection) shown in FIG. 5 in the image processing device of the first embodiment.

The image produced by the present image processing device differs from the image processing device of the fourth embodiment shown later, and does not exhibit generation of false contours in the photographic image region even when using the first region discrimination unit or using the second region discrimination unit (refer to section B of FIG. 13, section D of FIG. 14). The breaks and shoulders appearing in lines and text as well as dot dispersions in line/text images observed in the conventional image processing device are confirmed slightly in the line/text image of section E of FIG. 14, absolutely none were observed in the line/text image of section C in FIG. 13; the images of FIGS. 13 and 14 are both high quality images.

Figure 15:
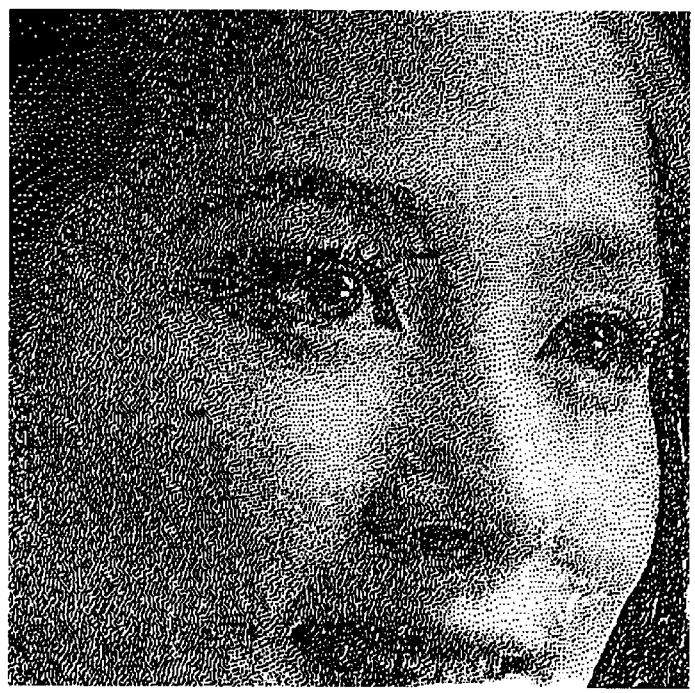
FIG. 15 is an illustration of an image produced by image data binarized by the image processing device of the third embodiment of the invention.
Figure 15:
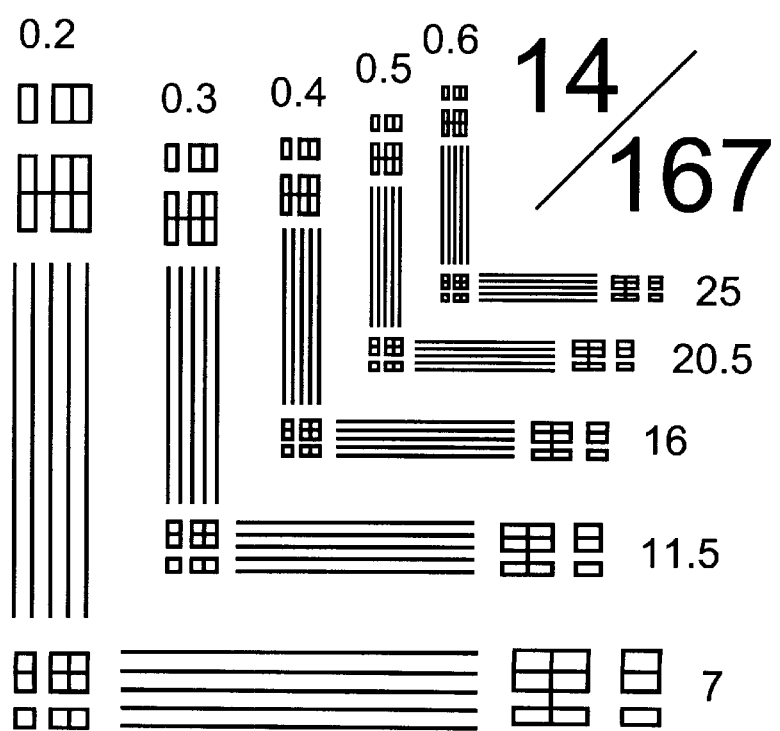

FIG. 15 shows an image proceeded by image data binarized by the image processing device of the third embodiment of the invention. The image produced with this image processing device is identical to that of the image processing device of the first embodiment and is an extremely high quality image.

Figure 16:
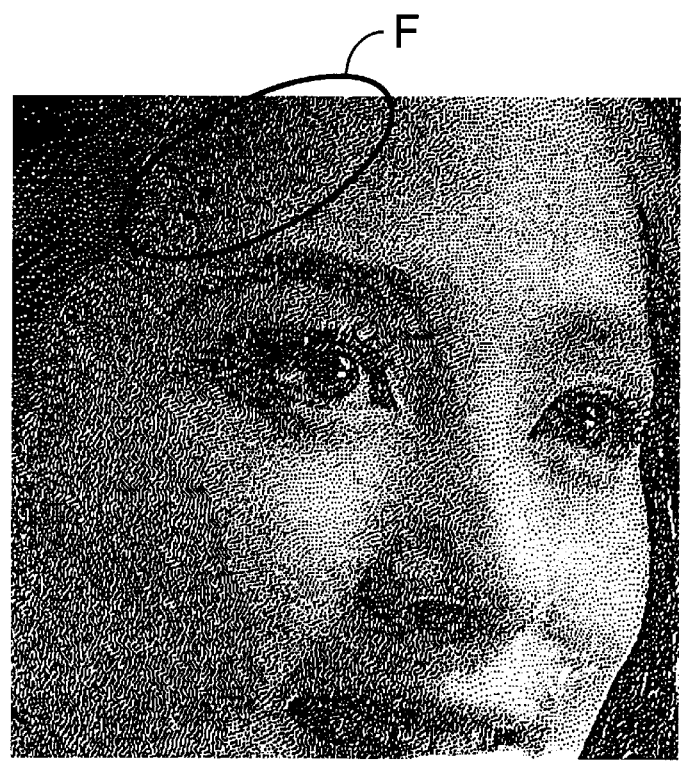
FIG. 16 is an illustration of an image produced by image data binarized by the image processing device of the fourth embodiment of the invention.
Figure 16:
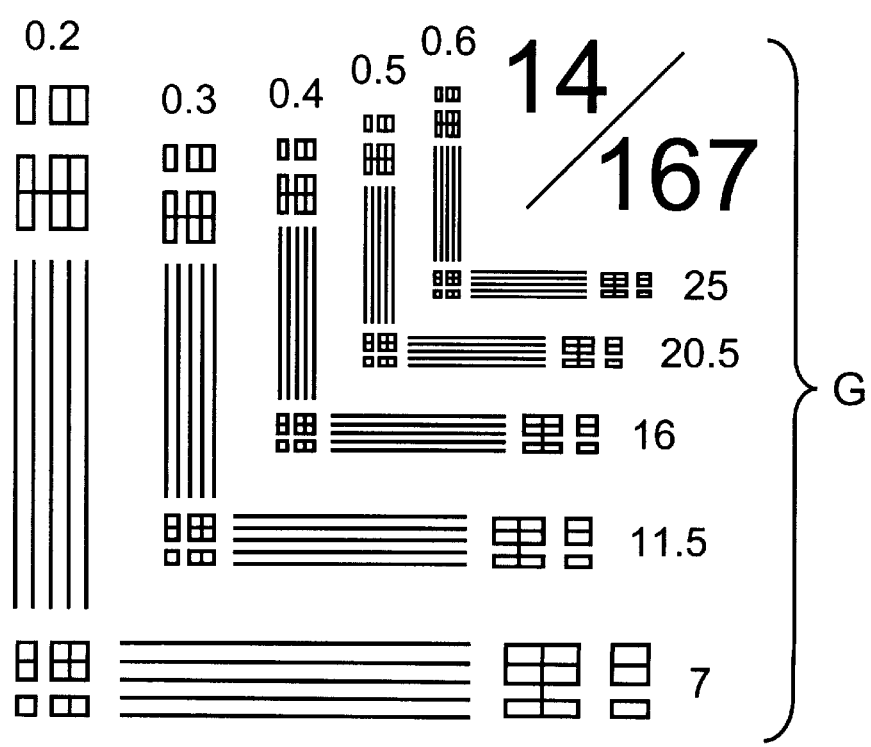

FIG. 16 shows an image produced by image data binarized by the image processing device of the fourth embodiment of the invention.

According to FIG. 16, although false contour did manifest in part of the photographic image produced by the image processing device of the fourth embodiment (refer to section F of FIG. 16), the breaks and shoulders appearing in line/text as well as dot dispersions in line/text images observed in the conventional image processing device are not apparent; the image shown in FIG. 16 is a high quality image for a line/text image.

Images produced by image data binarized by the image processing device of the first embodiment and image processing device of the third embodiment were confirmed to be high quality images compared to images produced by conventional image processing devices regardless of whether the image was a line/text image of photographic image. The image produced by image data binarized by the image processing device of the fourth embodiment was conformed to be a high quality image compared to an image produced by conventional image processing devices, and particularly so for line/text images.

What is claimed is:

1. An image processing device, comprising:
   an image data correction unit for correcting multi-level image data of a target pixel;
   an image data binarizer for binarizing the corrected multi-level image data of the target pixel;
   a binarization error calculator which calculates a first error between the corrected multi-level image data and data corresponding to the binarized image data; and
   means for executing a predetermined filtering process on the first error to calculate a second error, and means for weighting and averaging the second error;

wherein the image data correction unit corrects the multi-level image data by using the weighted and averaged second error.

2. An image processing device, comprising:
- an image data correction unit for correcting multi-level image data of a target pixel;
- an image data binarizer for binarizing the corrected multi-level image data of the target pixel;
- a binarization error calculator which calculates a first error between the corrected multi-level image data and data corresponding to the binarized image data;
- means for calculating a second error by executing a predetermined filtering process on the first error;
- means for discriminating characteristics of a second region based on a discrimination calculation of image data within the second region overlapping the first region; end
- means for calculating a third error by weighting and averaging one of the first error and the second error in the first region based on a discrimination result of the discrimination means;
- wherein the image data correction unit corrects the multi-level image data based on adding the third error to the multi-level image data of the target pixel.

3. The image processing device of claim 2, wherein the discriminating means determines whether the region is a line/text image region or a photographic image region.

4. An image processing device, comprising:
- an image data correction unit for correcting multi-level image data of a target pixel;
- an image data binarizer for binarizing the corrected multi-level image data of the target pixel;
- a binarization error calculator which calculates a first error between the corrected multi-level image data and data corresponding to the binarized image data;
- means for calculating a second error by executing a predetermined filtering process on the first error;
- means for discriminating characteristics of a region based on a discrimination calculation of image data within the region; and
- means for setting a coefficient used in the predetermined filtering process based on the discrimination result of the discrimination means;
- means for calculating a third error by diffusing the second error;
- wherein the image data correction unit corrects the multi-level image data based on adding the third error to the multi-level image data of the target pixel.

5. The image processing device of claim 4, wherein the discriminating means determines whether the region is a line/text image region or a photographic image region.

6. An image processing device, comprising:
- an image data correction unit for correcting multi-level image data of a target pixel;
- an image data converter for converting the corrected multi-level image data of the target pixel to converted data having fewer levels than the multi-level image data;
- an error calculator which calculates a first error between the corrected multi-level image data and data corresponding to the converted image data;
- means for calculating a second error by executing a predetermined filtering process on the first error;
- means for discriminating characteristics of a region based on a discrimination calculation of image data within the region; and
- means for calculating a third error by weighting and averaging one of the first error and the second error based on a discrimination result of the discrimination means;
- wherein the image data correction unit corrects the multi-level image data based on adding the third error to the multi-level image data of the target pixel.

7. An image processing device, comprising:
- an image data correction unit for correcting multi-level image data of a pixel;
- an image data converter for converting the corrected multi-level image data of the pixel into converted image data having fewer levels than the corrected multi-level image data;
- an error calculator which calculates an error between the corrected multi-level image data and data corresponding to the converted image data;
- means for discriminating characteristics of a region containing the pixel based on a discrimination calculation of image data within the region;
- means for executing a filtering process on the error to calculate a second error based on a discrimination result of the discriminating means, and
- wherein the image data correction unit corrects the multi-level image data by using the second error.

8. The image processing device of claim 7, wherein the discriminating means outputs a signal directly to the means for executing a filtering process.

* * * * *